United States Patent [19]

Shilling et al.

[11] Patent Number: 4,743,777

[45] Date of Patent: May 10, 1988

[54] STARTER GENERATOR SYSTEM WITH TWO STATOR EXCITER WINDINGS

[75] Inventors: William J. Shilling, Lima; Donal E. Baker, Elida, both of Ohio

[73] Assignee: Westinghouse Electric Corp., Pittsburgh, Pa.

[21] Appl. No.: 837,122

[22] Filed: Mar. 7, 1986

[51] Int. Cl.[4] .................... F02N 11/08; H02K 23/52; H02P 9/04

[52] U.S. Cl. .................................. 290/46; 290/38 R; 290/31; 322/29; 322/61

[58] Field of Search ....................... 290/46, 10, 22, 31, 290/38 R, 48, 39, 49, 40, 52; 318/136, 138, 431; 322/10, 29, 61; 363/41

[56] References Cited

U.S. PATENT DOCUMENTS 3,908,161 9/1975 Messenger ........................... 322/29

4,574,340 3/1986 Baker .................................. 363/41

*Primary Examiner*—William M. Shoop, Jr.

*Assistant Examiner*—Sharon D. Logan

*Attorney, Agent, or Firm*—R. P. Lenart

[57] ABSTRACT

A starter generator system is provided with a dynamoelectric machine having a stator and a rotor which is mounted for rotation with respect to the stator. The rotor carries a main field winding, an exciter armature winding and means for rectifying the output of the exciter armature winding to provide DC excitation for the main rotating field winding. A main armature winding is mounted on the stator and magnetically coupled to the main field winding. An exciter portion of the stator supports both a multiple phase AC exciter field winding and a distributed DC exciter field winding, both of which are mounted to be magnetically coupled to the exciter armature winding. A variable voltage, variable frequency power converter is capable of being alternatively connected to drive the dynamoelectric machine as a starting motor or to receive power from the machine during generator operation. During motor operation, the AC exciter field winding receives power from an external power source, usually of constant voltage and constant frequency. During generator operation, DC power is supplied to the DC exciter field winding.

6 Claims, 2 Drawing Sheets

66 64 42 32a 44 74 DC POWER SOURCE 76 CONTROL 70 40 36 38 30 72 33 PRIME MOVER 34 68 48 INPUT OUTPUT 54 60 50 VARIABLE VOLTAGE VARIABLE FREQUENCY POWER CONVERTER 56 52 46 58 62 32b

PRIME MOVER
34
33
CONTROL
70
72
DC POWER SOURCE
76
74
44
42
66
64
32a
30
38
40
36
32b
62
60
56
58
54
OUTPUT
VARIABLE VOLTAGE VARIABLE FREQUENCY POWER CONVERTER
46
INPUT
48
50
52
68

STARTER GENERATOR SYSTEM WITH TWO STATOR EXCITER WINDINGS

BACKGROUND OF THE INVENTION

This invention relates to electrical power generating systems that include synchronous dynamolectric machines and more particularly to winding configurations and system components which permit such machines to operate as either a starter or a generator in combination with a separate prime mover.

In airborne electrical power generation systems, it is desirable to have a single system which provides both the starter and generator functions. At present, aircraft engines are generally started by motor starters or gas turbines which are dedicated machines. In order to reduce cost and weight, it would be desirable to use the aircraft generators as motors during the engine start-up period and thereby eliminate the machines which were dedicated to engine starting.

Variable speed constant frequency (VSCF) power generation systems are commonly used for aircraft applications. In these systems, the aircraft engine drives a generator at a variable speed, thereby producing a variable frequency generator output. This output is then converted to a constant frequency output. In one type of VSCF system, the output of the variable speed generator is rectified to supply DC power to a pair of DC link conductors. An inverter circuit receives DC power from the link conductors and produces a constant frequency AC output. The inherent simplicity and reliability of DC link VSCF systems has been established and it is desired to modify the exiting designs to provide starter capability. To use such a system for engine starting, the converter (rectifier-inverter combination) could be reversed such tha ground power or another on-board aircraft electrical system would supply multiple phase constant frequency power to the converter. The converter would then supply the required variable frequency, multiple phase power to the main terminals of the generator to operate the generator as a motor, thereby driving the engine up to the desired speed. After the engine ignites and reaches idling speed, the synchronous machine is reconnected and operates as a generator to provide electrical power for the aircraft.

Operating a synchronous dynamoelectric machine as a motor with the subsequent conversion to generator operation can introduce a number of problems with respect to excitation of the machine. For initial motor operation, the main rotating field of the machine must be excited to provide flux even at zero rpm. This flux interacts with the main stator winding current to supply torque. The conventional aircraft generator has rotating field winding. For the generator to act as a motor and supply full torque which is capable of starting an aircraft engine from zero rpm, it is necessary that the rotating field be fully excited from zero rpm and up. At zero rpm, only transformer action is capable of supplying excitation to the rotating field. Numerous systems which use a dynamoelectric machine as both a starter and a generator have been designed and examples of such systems are disclosed in U.S. Pat. Nos. 3,809,914; 3,908,130; 3,908,161; 3,937,97; 4,093,869; 4,330,743 and 4,481,459. However, it is still desirable to have a synchronous dynamoelectric machine which includes a particular exciter stator winding configuration such that the machine may be operated as both a starter and a generator in conjunction with a DC link VSCF power system with only minor modifications of the existing VSCF system hardware.

SUMMARY OF THE INVENTION

In this invention, when the generator is operated as a starter motor at zero rpm, the main rotating field excitation is provided by transformer action between an exciter field stator winding and an exciter armature winding. The main AC stator winding is driven by a variable voltage/variable frequency power converter for motor operation. The excitation (volt-amps) which must be delivered to the exciter field during motor operation is significantly greater than the excitation which must be delivered to the exciter field for generator operation. The present invention seeks to provide the required two distinctly different exciter field excitation levels through the use of two separate exciter field windings, one is a multi-phase AC distributed winding and the other a DC distributed field winding.

A starter generator system constructed in accordance with the present invention comprises a dynamoelectric machine having a stator and a rotor which is mounted for rotation with respect to the stator. The rotor supports a main field winding, an exciter armature winding and means for rectifying the output from the exciter armature winding to provide DC excitation for the main rotating field winding. A main multi-phase AC armature winding is mounted on the stator and magnetically coupled to the main rotating field winding. A multiple phase AC exciter field winding and a distributed DC exciter field winding are mounted on the stator and magnetically coupled to the rotating exciter armature winding.

When the machine is operated as a motor, an external power source is connected to the input of a variable voltage, variable frequency power converter. The output from this converter then provides variable voltage, variable frequency power to the main armature winding of the machine. At the same time, the AC exciter field winding is supplied by an external AC power source, usually of constant frequency and constant voltage. When the machine is connected for generator operation, the main armature winding is connected to the input of the variable voltage, variable frequency power converter and, at the same time, DC power is supplied to the DC exciter field winding. The variable voltage, variable frequency power converter then supplies constant voltage and constant frequency power at its output.

The present invention also encompasses a dynamoelectric machine for use in the above starter generator system. Such a machine comprises a stator and a rotor which is mounted for rotation with respect to the stator. The rotor carries a main field winding, an exciter armature winding and means for rectifying the output from the exciter armature winding to provide DC excitation for the main field winding. A main armature winding is mounted on the stator and magnetically coupled to the main field winding. A multiple phase AC distributed exciter field winding and a distributed DC exciter field winding are mounted on the stator and magnetically coupled to the exciter armature winding. In some specialized applications, a single phase AC exciter field winding may be used.

DESCRIPTION OF THE PREFERRED EMBODIMENT

Figure 1:
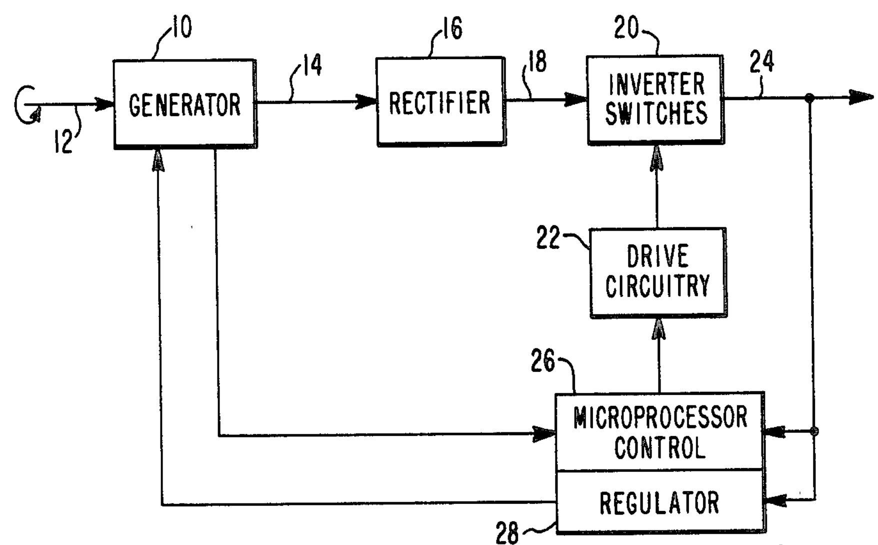
FIG. 1 is a block diagram of a prior art variable speed constant frequency power system.

Referring to the drawings, FIG. 1 is a block diagram of a prior art VSCF system wherein a generator 10 is driven by a prime mover, for example, an aircraft engine, by way of shaft 12. The generator produces a variable frequency output on line 14 which is rectified by rectifier 16 to produce a DC voltage on line 18. A plurality of inverter switches 20 are driven by drive circuitry 22 to produce a constant frequency output on line 24. Control circuitry which includes microprocessor control 26 and regulator 28 monitors the constant frequency output on line 24 and controls the switching pattern of the inverter switches. The regulator controls the excitation of the generator exciter winding to regulate the AC output voltage on line 24.

Figure 2:
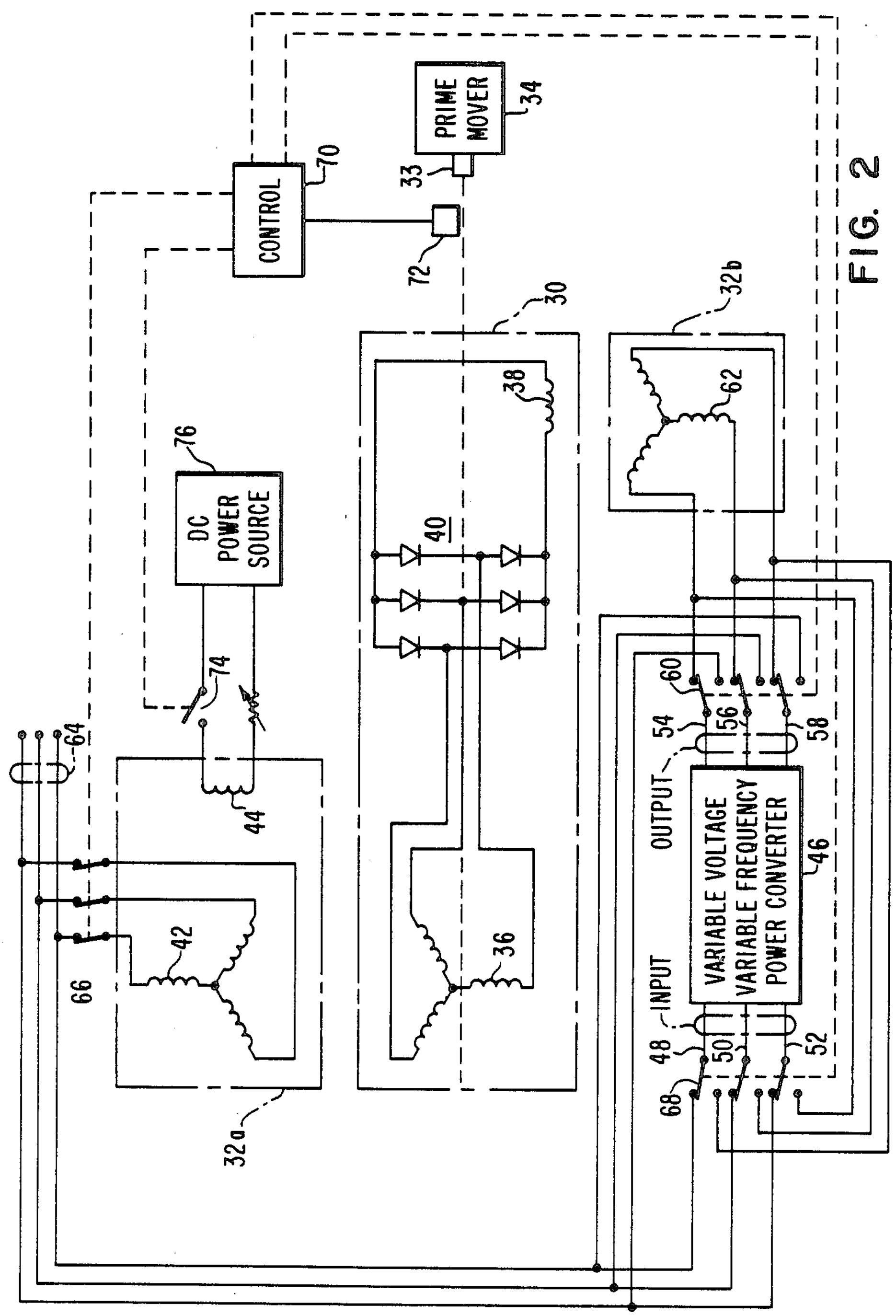
FIG. 2 is a schematic diagram, partially in block diagram form, of a preferred embodiment of the present invention.

FIG. 2 is a schematic diagram, partially in block diagram form, of one embodiment of the present invention. A dynamoelectric machine comprises a rotor 30 and a stator having an exciter section **32*a* and a main section 32*b*. The rotor is mounted for rotation with respect to the stator and is driven by way of a shaft 33 from a prime mover 34 which may be, for example, an aircraft engine. The rotor supports a three-phase exciter armature winding 36, a main field winding 38, and a diode bridge 40 which serves as means for rectifying the output of the exciter armature winding 36 to provide DC excitation for the main field winding 38. The exciter stator section 32*a* carries two exciter field windings which are magnetically coupled to the exciter armature winding 36. The first exciter field winding 42 is a multiple phase AC exciter field winding which is used when the dynamoelectric machine is operated as a motor. The second exciter field winding 44 is a DC exciter field winding and is used when the dynamoelectric machine is operated as a generator. A variable voltage, variable frequency power converter 46 includes items 16, 20, 22, 26 and 28 of FIG. 1. Power converter 46 is connected to a plurality of input lines 48, 50 and 52 and a plurality of output lines 54, 56 and 58. Switch 60 is used to alternatively connect the output of power converter 46 to the dynamoelectric machine main armature winding 62 or to the AC power bus 64. Switch 68 is used to alternatively connect the input of power converter 46 to the AC power bus 64 or to the main armature winding 62**.

During motor operation, an AC power bus 64, which may be supplied by a ground power unit or another on-board aircraft electrical system, supplies power to the multiple phase exciter armature winding 42 by way of switches 66 and also supplies power to the input of power converter 46 by way of switch 68. Switch 60 is in the position shown in FIG. 2 such that power converter 46 supplies power to the main armature winding 62. Power converter 46 would be designed to provide a constant voltage to frequency ratio output as disclosed in a commonly-owned copending application Ser. No. 623,582, filed June 22, 1984, now U.S. Pat. No. 4,574,340, which is hereby incorporated by reference. When the prime mover engine has ignited and reached idling speed, control 70, which may be responsive to a rotor speed/position sensor 72 or may be manually operated, opens switch 66 and moves switches 60 and 68 to the alternative position such that the main armature winding 62 is connected to the input lines of power converter 46. At the same time, switch 74 is closed so that the DC exciter field winding 44 receives DC power from DC power source 76. This DC power source may be, for example, an integral permanent magnet generator which is mounted within the dynamoelectric machine, or a separate DC power source.

It should therefore be apparent that three-phase power is applied to the three-phase main armature winding during engine start. This causes flux to rotate relative to the stator at a speed dependent upon applied frequency and the number of poles of the main armature winding 62. At the same time, the AC output of the exciter armature winding 36 which has been induced by AC excitation of the AC exciter field winding 42, is rectified by the rotating rectifier in a normal manner to supply excitation to the rotating main field winding 38, even at zero rpm.

In the preferred embodiment of this invention, constant frequency (usually 400 Hz for an aircraft system) and constant voltage excitation is supplied to the AC exciter field winding 42. This AC excitation can have either forward or reverse phase sequence relative to the shaft rotation. Certain advantages or disadvantages will result from either choice of sequence. Thus if a forward sequence is chosen, excitation to the rotating field winding 38 will decrease as the shaft speed increases; however, the motor torque developed in the exciter will aid the torque developed by the main machine. Likewise if the opposite sequence excitation is supplied to the exciter field winding 42, excitation to the rotating field winding 38 will increase with shaft speed and exciter torque will oppose main machine torque. Thus the choice of exciter excitation phase sequence to winding 42 is optional. It is likely that one specific sequence will be found most advantageous for a specific machine design in a given application. Likewise the number of exciter poles is optional and will affect the engine start characteristics of the machine. It is expected that the usual choice of poles will be 2 or 4.

Figure 3:
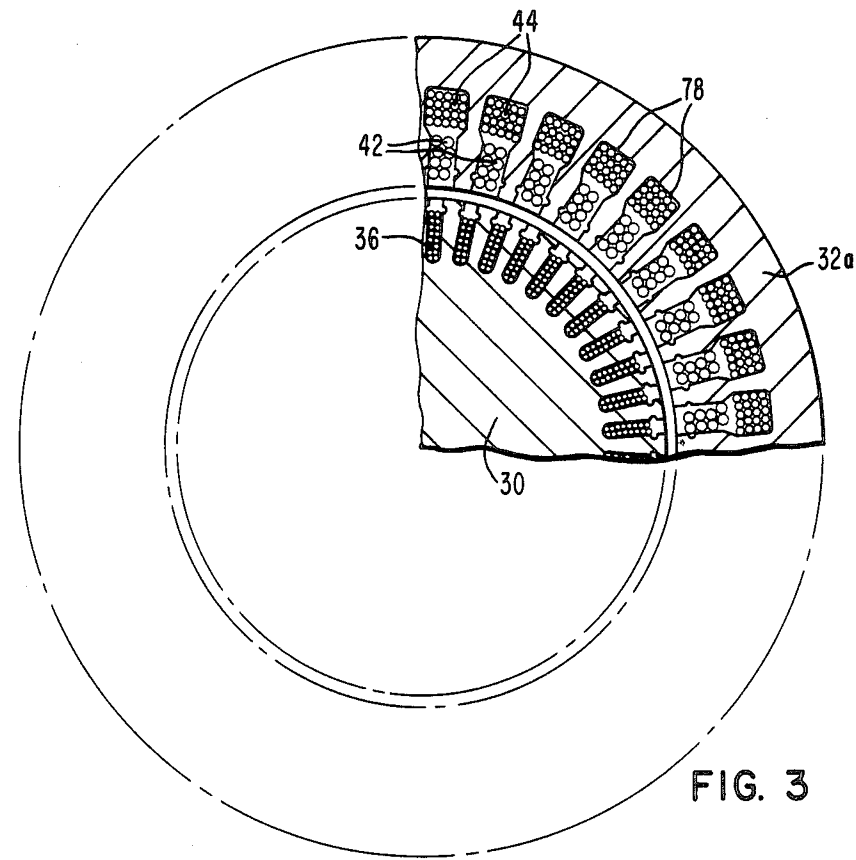
FIG. 3 is a cross-section of a portion of a dynamoelectric machine constructed in accordance with the present invention.

For normal generator operation, DC excitation is supplied to a separate DC exciter stator winding 44 as in a normal exciter used in an aircraft brushless generator. However, instead of a salient pole structure as is commonly found in aircraft brushless generators, the DC winding 44 of the present invention is wound into the exciter stator structure to form a distributed winding. This is illustrated in FIG. 3 which is a partial cross-section of the exciter section of a dynamoelectric machine constructed in accordance with the present invention. The exciter stator is seen to include a plurality of uniformly displaced slots 78. Each of these slots contains conductors of both the multiple phase exciter field winding 42 and the DC exciter field winding 44. However, in some designs, the DC exciter field winding may not fill all of the slots.

A rough design of a 75 kVa dynamoelectric machine which would be constructed in accordance with the present invention has been developed. This design assumed that three phase, 120 volt, 400 Hz. power is available for exciting the multiple phase AC exciter field winding and that the exciter must deliver the same power to the rotating field at 0 rpm as required for a 2 per unit overload normal generator operation, which in this case is 4,800 watts. Another assumed design requirement was that the excitation of the DC exciter field winding was not to exceed 8 amps DC and 80 volts DC. Based on these assumptions, it was determined that an existing generator design could be modified by removing the exciter stator salient pole field structure and replacing it with a stack of slotted punchings containing a plurality of cutouts arranged to form a plurality of uniformly spaced longitudinal slots for receiving the DC distributed exciter field winding and the three phase AC exciter field winding as shown in FIG. 3. This modification resulted in an overall diameter increase from 5.44 to 6.156 inches. The stator stack thickness increased from 0.73 to 0.9 inches and the original 8 pole exciter changed to 4 poles. The total machine weight increased by about 16%. Maximum DC exciter field excitation for generator operation during overloads is calculated to be 450 watts. AC exciter field excitation for motor starting was 9.14 kVa at zero rpm.

Specifications of the exciter portion of the designed evaluated above included an armature (rotor) having 45 slots. A single path, three phase lap winding of 0.057 inch wire was wound through these slots with a 60° phase belt and a throw of 11 slots. The Hiperco 50 steel rotor punchings had an outside diameter of 3.88 inches, an inside diameter of 2.25 inches and a stack width of 0.9 inches. Hiperco is a registered trademark of the Carpenter Technology Corporation, Reading, PA. The stator had an outside diameter of 6.156 inches, a stack width of 0.9 inches and 36 slots. The stator-to-rotor single air gap was 0.018 inch. The engine start winding was a three phase, wye connected, AC winding of 0.051 inch wire, with 12 conductors per slot and a throw of 9 slots. The DC winding for generator operation was a distributed, concentric winding of 0.0285 inch wire, with 64 conductors per slot and wound in slots 2, 3, 4, 6, 7, 8, 11, 12 etc.

It should be noted that if there were no DC winding in this design and if during normal generator operation, one were to attempt to excite the AC winding with DC current (in any winding combination, e.g., phase A only; phase A in series with phase B; or phase A in series with phases B and C in parallel) then the DC excitation current would be excessive. Likewise if there were no three phase AC winding and if during engine start, one were to attempt to excite the DC winding with either 120 volts or 208 volts, 400 Hz, single phase, there would be insufficient excitation to provide the required field for motor operation. Thus two exciter stator windings are used to meet excitation requirements for both engine starting and normal generator operating modes. It should be understood that during generator operation, the AC exciter field winding may be used in a series combination with the DC exciter field winding.

During engine start, a relatively high AC voltage will be generated in the DC exciter field winding; for example, possibly 825 volts in the above design. This voltage will be seen between the ends of the total winding. In order to reduce this voltage during start, this winding may be broken and reconnected so that two pole windings are in opposition to the other two. In that case, the maximum voltage seen between any two points in the example DC exciter field winding would be 413 volts.

Although the present invention has been described in terms of what is at present believed to be its preferred embodiment, it will be apparent to those skilled in the art that various changes may be made without departing from the scope of the invention. The appended claims are therefore intended to include such changes.

What is claimed is:

1. A starter-generator system comprising:

a dynamoelectric machine having a stator and a rotor which is mounted for rotation with respect to said stator;

a main field winding;

an exciter armature winding;

means for rectifying an output from said exciter armature winding to provide DC excitation for said main field winding;

said main field winding, exciter armature winding, and means for rectifying being mounted for rotation with said rotor;

a main armature winding mounted on said stator and magnetically coupled to said main field winding.

a distributed AC exciter field winding mounted on said stator;

a distributed DC exciter field winding mounted on said stator;

said AC and DC exciter field windings being magnetically coupled to said exciter armature winding;

a variable voltage, variable frequency power converter having an input and an output;

means for alternatively connecting said main armature winding to the output of said variable voltage, variable frequency power converter when said dynamoelectric machine is operated as a motor and connecting said main armature winding to the input of said variable voltage, variable frequency power converter when said dynamoelectric machine is operated as a generator;

means for supplying power to the input of said variable voltage, variable frequency power converter when said dynamoelectric machine is operated as a motor;

means for supplying external AC power to said AC exciter field winding when said dynamoelectric machine is operated as a motor;

means for supplying external DC power to said DC exciter field winding when said dynamoelectric machine is operated as a generator.

2. A starter-generator system as recited in claim 1, further comprising:

control means for switching said dynamoelectric machine from a motor mode to a generator mode when a prime mover, mechanically connected to said dynamoelectric machine, has reached a predetermined operating speed.

3. A starter-generator system as recited in claim 1, wherein:

said stator includes a plurality of uniformly spaced longitudinal slots, and conductors of both said AC exciter field winding and said distributed DC exciter field winding which pass through said slots.

4. A starter-generator system as recited in claim 1, wherein:

the impedance to DC current of said DC exciter field winding is greater than the per phase impedance to DC current of said AC exciter field winding.

5. A starter-generator system as recited in claim 1, wherein said AC exciter field winding is a multiple phase winding.

6. A starter-generator system as recited in claim 5, wherein the per phase impedance to AC current of said multiple phase AC exciter field winding is lower than the impedance to AC current of said distributed DC exciter field winding.

* * * * *